United States Patent Office 3,522,101
Patented July 28, 1970

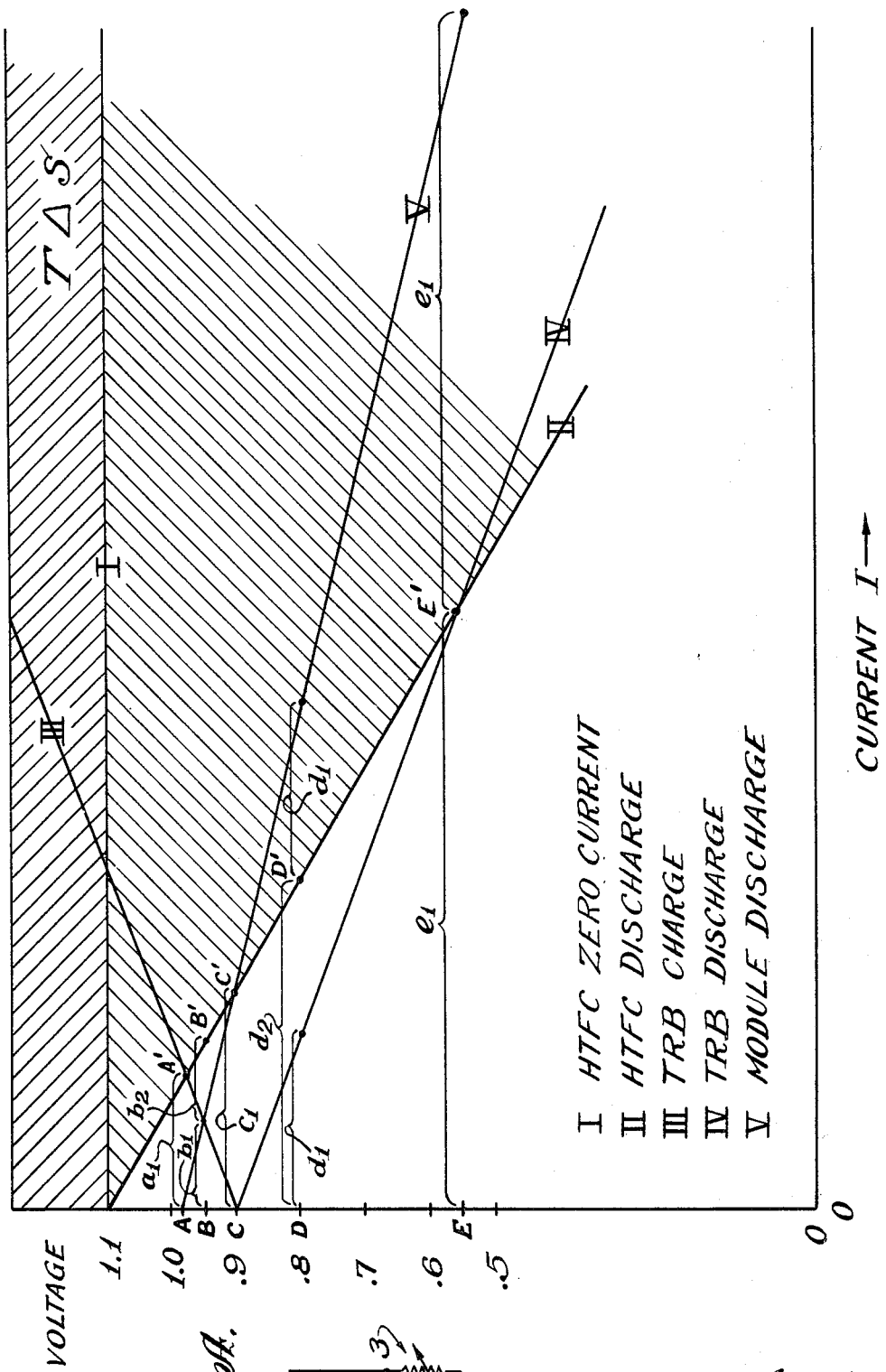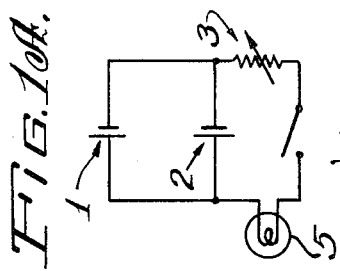

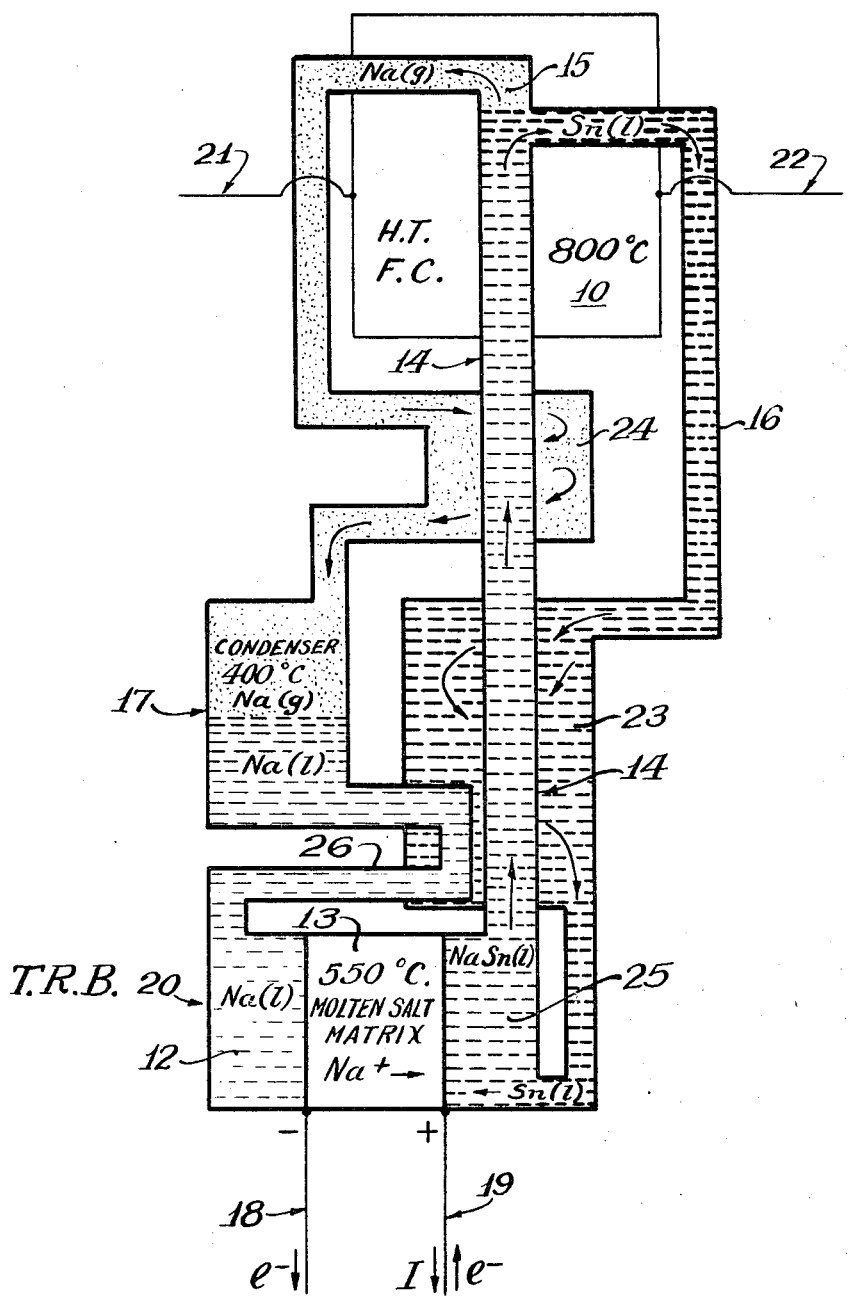

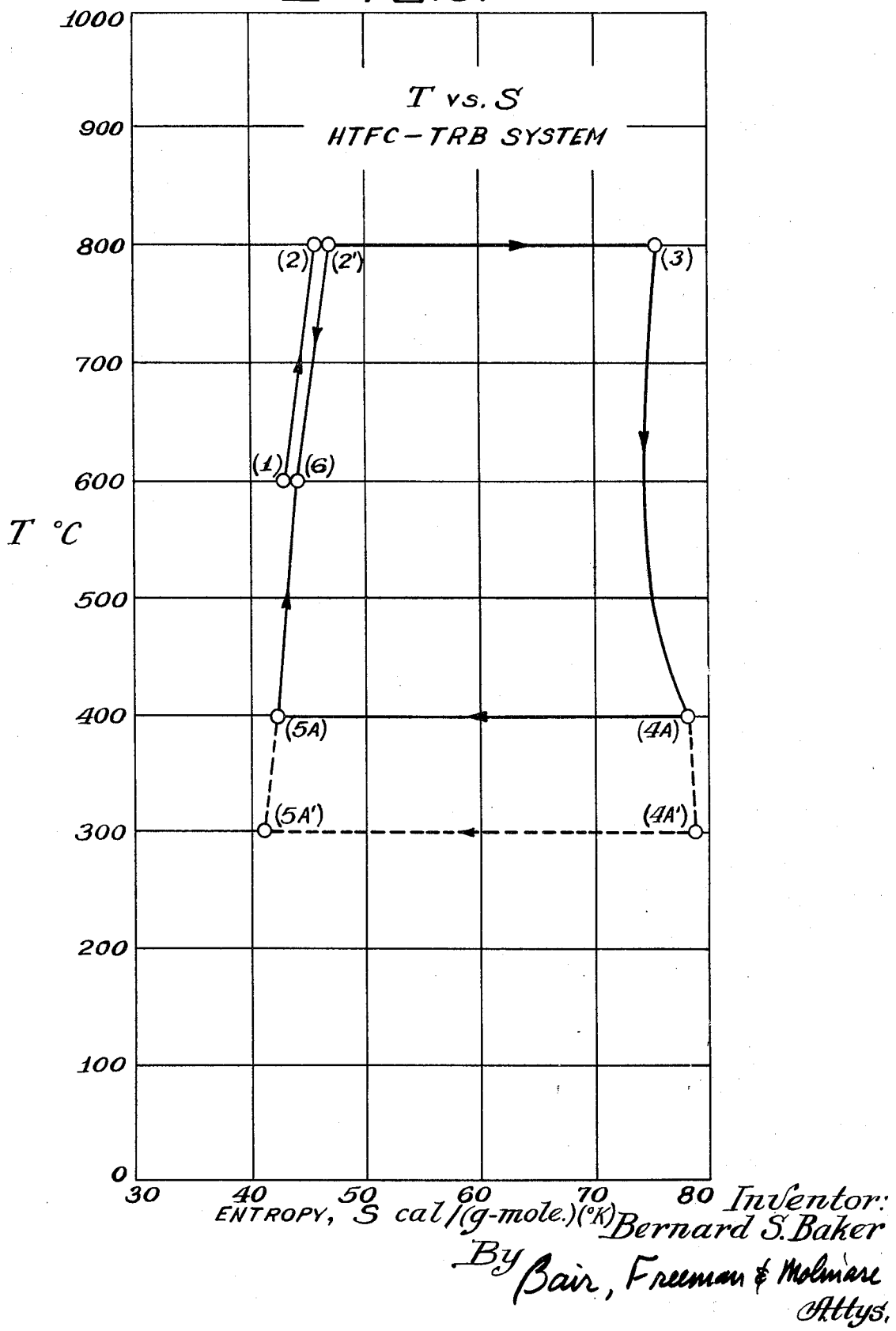

3,522,101
POWER MODULE INCLUDING THERMALLY REGENERATIVE BATTERY AND FUEL CELL AND METHOD OF OPERATION
Bernard S. Baker, Chicago, Ill., assignor to Institute of Gas Technology, a not-for-profit corporation of Illinois
Filed Jan. 10, 1968, Ser. No. 696,932
Int. Cl. H01m 27/00
U.S. Cl. 136—86                                 16 Claims

ABSTRACT OF THE DISCLOSURE

The application discloses a power supply-storage module and method of operation that provides the needs of a widely fluctuating power consuming system. It comprises a high temperature fuel cell (HTFC) in combination with a thermally regenerative battery (TRB), the two being thermally coupled, or connected in series, and electrically connected in parallel.

FIELD AND BACKGROUND

The field of this invention is that of electric power producing devices, and more specifically relates to a power supply-storage module that provides the needs of a widely fluctutaing power consuming system, and which comprises in combination special types of high temperature fuel cells (HTFC) and special types of electrically and thermally rechargeable batteries (TRB).

A need for a power supply-storage module arises in power plants of vehicles that must be capable of providing power outputs of various levels depending on the momentary function of the vehicle. In addition, such modules are useful as auxiliary power supplies such as employed for generators, compressors and the like which require widely varying power output levels depending on the momentary function. The conventional approach to this problem is to design a power plant for peak power requirements; the normal operation of such a power plant is thus far below the peak power required, and the normal loitering of the reserve power capability represents a serious design inefficiency. However, the power plant can be designed for average rather than peak power consumption if a storage unit is incorporated with the main power source.

Fuel cells have fairly recently come of interest as power sources. A fuel cell is a device which continuously produces DC electrical power from the electro-chemical oxidation of a fuel by an oxidant. Typical fuels are hydrocarbons, or hydrogen and carbon monoxide mixtures, or pure hydrogen, and typical oxidants are air or oxygen Fuel cells can be made to operate over a wide temperature range usually determined by the type of electrolyte used. A particular type of fuel cell are those designed as high temperature fuel cells which operate from 600 to 1100° C. and which employ either molten salt or solid oxide-type electrolytes. A well known characteristic of the fuel cell is its relaively linear voltage-current curves. Such a curve indicates the E.M.F. derivable from a given type of fuel cell as a function of current density, the current per unit area of electrode. A typical current-voltage characteristic for a molten carbonate fuel cell would indicate the electrical power derivable from the cell as a product of the voltage and current density along any point on the curve.

A by-product of the oxidation of the fuel in the fuel cell is the production of heat which is difficult to remove. Temperature distributions show undesirably high peak temperatures near the center of the cells. Any fuel cell which is less than theoretically efficient will show a current-voltage characteristic curve which, although almost linear, will deviate below a zero current theoretical voltage, a horizontal line on a voltage-current graph. On such a graph of E.M.F. in volts against current density measured in amps per sq. foot, the product of the current density and deviation of the operating voltage from the zero current theoretical voltage line is a partial measure of the thermal energy or waste heat produced by the fuel cell. The waste heat is represented by the area between the zero current theoretical voltage line and the current voltage characteristic curve for the particular fuel cell. The heat generated in the fuel cell is a disadvantage of fuel cells, both from the point of view of its difficulty in removal and in the fact that it is waste heat representing a lowering of efficiency of the power source. Such factors, in addition to weight and cost factors, mitigate against a fuel cell being widely used as a primary power source.

As a storage source for integration into a power module for delivering power surges when peak power is required, batteries represent a valuable solution, but also present certain problems. Batteries generally are quite heavy and must be electrically recharged from time to time since they have a finite capacity.

THE INVENTION

Objects

Therefore, it is an object of this invention to provide a power supply-storage module of high efficiency, and which shows improved voltage-current characteristics as compared to prior types of primary power sources in combination with a storage source and which is load demand responsive.

It is also an object of this invention to provide a power supply-storage module that is readily controllable in operation and which can provide not only average power and power peaks for a limited period of time, but also shows an improved continuous peak characteristic.

It is also an object of this invention to provide a means for removing and moderating the heat generated from a high temperature fuel cell and to utilize this heat in improving the overall efficiency of the power supply-storage module system, and which fuel cell in combination with a thermally regenerative battery thereby defines a module that is load demand responsive.

It is still another object of this invention to provide a power supply-storage module employing a high temperature fuel cell having a more nearly isothermal temperature distribution in the center of the cell, and more nearly isothermal operating characteristics in general.

These and other objects of the invention will appear from the detailed description which follows.

The invention

The objects of this invention are achieved by the combination to form a power module of special types of high temperature fuel cells with special types of electrically and thermally regenerable batteries, and integration of their operation. In particular, the high temperature fuel cell and thermally regenerable battery components of the module are thermally coupled, or combined in series, and are hooked electrically in parallel. An exemplary fuel cell is a JP-4 fueled molten carbonate system, and the thermally regenerative battery most preferred is of a bimetallic sodium-tin system.

In general, the invention embodies the combination of fuel cells operating in the 600 to 1100° C. range with thermally rechargeable batteries operating typically between 300 to 700° C., but not restricted to that temperature range. The thermally regenerative battery is unique in that it can be recharged either electrically or thermally. By combining the thermally rechargeable battery with the high temperature fuel cell, it is possible to use waste heat from the fuel cell to recharge the battery thermally, and simultaneously use electrical power from the fuel cell to recharge the battery electrically when needed. The regeneration of the thermal battery by thermal means involves a near isothermal distillation process in which the metal-metal compound formed in discharge of the battery is separated into two metals, one liquid in form and the other vaporous, by a distillation-like process. The heat removal from the fuel cell can be effectively accomplished by the distillation process occurring in the thermally regenerative battery.

The invention is described in more detail below with reference to the figures, in which:

FIG. 1 compares the voltage-current characteristic curves for a typical thermally regenerative battery, a typical high temperature molten carbonate fuel cell, and the combined system of this invention;

FIG. 1a is a schematic circuit diagram of the electrical interconnection of the two module components; and FIG. 2 shows in schematic one embodiment of the physical and thermal interconnection of the two module components of this invention;

FIG. 3 is a temperature-entropy diagram for a typical system of this invention.

Detailed description

A thermal battery can chemically be represented by the reaction:

Anode: $M \rightarrow M^+ + e^-$     (1)

Cathode: $M^+ + e^- + N \rightarrow MN$     (2)

The electrolyte for such a battery is of the form MX where M is an alkali metal such as sodium (Na), lithium (Li), or potassium (K). X is a halide such as fluoride (F), chloride (Cl), bromide (Br) or iodide (I). The substance N is a low melting point and high boiling point metal such as tin (Sn), lead (Pb), bismuth (Bi), tellurium (Te) or selenium (Se). A thermal battery operates at a temperature $T_1$ above the melting point of the halide electrolyte mixture and on discharge is described by reactions (1) and (2). On electrical recharge reactions (1) and (2) are simply reversed, that is:

Anode: $M^+ + e^- \rightarrow M$     (3)

Cathode: $MN \rightarrow M^+ + e^- + N$     (4)

Unlike other types of batteries, a TRB can be restored to a charge state by thermal regeneration, also termed thermal recharging. On thermal recharge compound MN is separated into M and N by heat as shown in the equation below:

$$heat + MN \rightarrow M + N \quad (5)$$

Reaction (5) takes place at a temperature $T_2$ above the boiling point of M but below the boiling point of N. $T_2$ is above $T_1$. The efficiency of the thermal recharge is limited by the usual heat engine (Carnot) efficiency which is dependent on the temperature of the condenser $T_3$ from which heat is rejected from the system and is given below:

$$\eta_o = \frac{T_2 - T_3}{T_2}$$

where $T_2$ and $T_3$ are expressed in absolute degrees.

The basic requirements of the thermally regenerative bimetallic battery is a high specific energy, fast response, and compatability with the high temperature fuel cell, here preferably a molten carbonate fuel cell. Physical and electrochemical data are available for the Na-Bi, Na-Pb, and Na-Sn systems and the corresponding Li and K systems. However, the lithium systems are difficult to regenerate thermally. They are not compatible with fuel cells operating in the ranges contemplated herein. Of course where fuel cells using materials of the appropriate thermal characteristics are operable in the lithium system temperature range, that system would be evidently useful. Because of the higher atomic weight of potassium and the lower cell working potentials, the potassium system has low specific energies and is not preferred. It is preferred to work with the sodium couples Na-Bi, Na-Pb, or Na-Sn, and of these couples, the Na-Sn is presently preferred. The thermal battery made with sodium and tin operates approximately at a temperature of 550° C. Any of the well known high temperature fuel cells may be used, and as contemplated herein a molten carbonate type fuel cell operating practically in a temperature range of from 600 to 850° C. on hydrogen-rich and/or carbon monoxide rich fuels is exemplary.

With respect to FIG. 1, the horizontal line I at 1.1 volts represents the zero current theoretical voltage of a molten carbonate fuel cell of high efficiency, in practical operating terms being about 35 to 50% efficiency. The shaded area above that line represents TΔS heat not recoverable by the fuel cell and represents 40 to 60% of the ultimate total lost heat. The theoretical zero current voltage line is represented as I. The discharge line of the fuel cell is represented as line II and has a nearly linear characteristic in the case of a molten carbonate HTFC. The shaded area of the graph between lines I and II plus the TΔS area represents the waste heat of the fuel cell that may be used to thermally recharge the battery of this system. Approximately 37–38% of this heat theoretically may be used in the preferred temperature range here, thus representing an overall increase of 15 to 20% in the efficiency of the entire system as compared to a fuel cell alone, or a fuel cell connected only electrically with a battery. It should be appreciated that in recovering this heat which would otherwise be lost, the thermally regenerative battery is operating as a heat engine in the thermal regeneration mode of its operation. In actual practice about a 7–15% overall increase in efficiency is possible.

Any number of fuel cells may be used in series or parallel as the fuel cell "component" of the module. Any number of batteries may be used similarly to form the thermally regenerative battery "component" of the module. The absolute potentials of the high temperature fuel cell and thermally regenerative batteries are not significant, but are preferably chosen so that the combination of thermally rechargeable batteries alone are less than that of the fuel cell in order to have proper integration for electrically recharging of the thermally rechargeable battery by the fuel cell.

In FIG. 1, the fuel cell component, or combination, or combination of fuel cells in series, has an absolute theoretical potential of 1.1 volts. A thermally rechargeable battery typically presently operates at between .5 to .7 open circuit voltage. To form a battery component a plurality may be combined in series to provide a battery having an absolute potential of .9 volt, as in FIG. 1. A particularly useful embodiment employs fuel cells in parallel to obtain a high current value fuel cell component, while several thermally rechargeable batteries are wired in series to obtain a useful voltage potential battery component. These components are then wired together in parallel to form the individual module, and in turn modules may be wired in series or parallel as desired. Other useful combinations are self-evident to one skilled in the art.

The line III on FIG. 1 represents the charge line of the thermally rechargeable battery. Line IV shows the corresponding discharge line which is the mirror image taken along the horizontal line representing .9 volt the open circuit theoretical voltage of the thermally rechargeable battery component used in this example.

A schematic circuit diagram, FIG. 1a is shown in the lower portion of FIG. 1 wherein a high temperature fuel cell component 1 and a thermally rechargeable battery component 2 are wired electrically in parallel, and the circuit is completed with a variable resistor 3, a switch 4 and a power using source 5, in this case a light bulb. The electrical characteristics of the combined system can be seen with reference thereto.

In FIG. 1, A–E represent various potential levels corresponding to variable load characteristics, here the intensity of the light in the schematic circuit diagram FIG. 1a. Below the level C, the battery component is a worker in the system, but at no time does it "charge" the fuel cell compartment. The combined voltage-current discharge line for the module of this invention is represented by the line V. Line V is the sum of the current values of II and III. Note that above a voltage C the current contributed by III is negative, i.e. the battery is being charged electrically by the fuel cell.

With the switch open, the fuel cell component, being at a higher absolute potential, can electrically charge the battery component. The fuel cell discharges along line II and the battery charges along line III. As the current flow increases to $a_1$, the voltage drops to the potential level A, A' on FIG. 1, corresponding to an open switch 4 in FIG. 1a. The potential A, A' is thus determined only by the relative internal resistances of fuel cell and battery. This is at the point of intersection of the TRB component charge line III and the HTFC component discharge line II. At this condition of operation, the fuel cell is providing all its electrical energy to electrically charge the battery at the average voltage of the battery and the fuel cell components, here slightly less than 1.0 volt, since the internal resistance of the HTFC is slightly greater than that of the TRB. The bulb does not light since the circuit remains open.

Then, assuming the switch 4 is closed and the resistor 3 is adjusted to provide a little current to the bulb, the potential drops still further upon the increased draw of current. At the potential level B, B' the amount of current $b_1$ is drawn from the battery to charge the battery electrically. The remaining current drawn from the fuel cell $b_2$ goes to the load, in this case a light bulb, which it lights. The battery is regenerated thermally by the excess heat from the fuel cell in the amount represented by the $T\Delta S$ heat plus the area of the graph between the 1.1 voltage line and the point B' on the fuel cell discharge line II.

It can be recognized that until the potential falls below level C, C' in FIG. 1, there is no load draw on the battery. When the resistance R is reduced still further from the conditions given above, so that there is a further current draw and potential drop to the .9 volt level, the circuit operates electrically as if the battery component is absent, since .9 volt is the open circuit potential of the battery component. Thus, the amount of current $c_1$ drawn from the fuel cell goes directly to the load, and no current from the fuel cell is used to electrically charge the battery. At this level of operation, the battery continues to be regenerated thermally by the excess heat from the fuel cell, and the fuel cell in turn is moderated more nearly isothermally by the removal of heat.

At the potential level D, the current represented by $d_1$ is delivered from the TRB component to the load. The HTFC component delivers an amount of current greater than that value, as represented by the amount of current $d_2$. Both the battery and the fuel cell are discharging along line V for a total of $d_1$ plus $d_2$. As above, the battery is regenerated thermally by the excess heat of the fuel cell. It is observed that as the load current increases, the drain on both battery and fuel cell is increased. But the fuel cell under this condition is also generating more heat with which it can thermally regenerate the battery at a faster rate. Since the battery is able to be regenerated faster, the discharge drain is partially compensated. No previously known power module possesses this unique property.

At level E, the current $e_1$ from both the TRB and HTFC components are equal and are delivered to the load while the battery is regenerated thermally by the still greater excess heat from the fuel cell. Below the potential level E the battery is delivering more current than the fuel cell and that condition represents the peak power mode of operation of the system.

Still another embodiment employs a TRB and HTFC component having the same voltage potential, the TRB recharging being done only through thermal regeneration.

The HTFC alone runs about 80 lbs. per kilowatt output, with 20 kilowatts being equivalent to about 26 brake horsepower. The fuel cell would produce about 20 kilowatts average and 25 kilowatts peak power but the efficiency drops off at the peak power level. With the addition of about 120 lbs. of sodium-tin active battery material, the module of this invention will produce approximately 20 kilowatts average power, 50 kilowatts peak for up to 10 minutes per hour, and in addition has a 30 kilowatt continuous peak power output.

FIG. 2 shows a schematic of one embodiment of the physical and thermal interconnection of the module of this invention. The HTFC component 10 is located above the TRB component 20. In the TRB, the sodium-tin cathode 25 is separated from the sodium anode 12 by an electrolyte matrix 13 comprising a suitable inert carrier containing a conducting electrolyte. A typical electrolyte is a sodium halide eutectic mixture, for example, a mixture of NaI, NaBr, and NaF, or NaI, NaBr and NaCl, or the like. The cationic component of the electrolyte must correspond to the anodic fluid in order that there be a continuous loop in the system of the TRB pole or terminal fluid. The battery is designed to take advantage of the difference in specific gravities of the various materials and mixtures in the system. The sodium-tin solution is transferred in the regeneration chamber or zone 15 in the HTFC via conduit 14 by natural convection; no pump is required. The driving force the convection is the concentration differences of the sodium in the sodium-tin cathodic fluid as compared to the relatively sodium-free tin produced in the regeneration chamber. The sodium-containing tin solution will be lighter than the purified tin solution entering the cathode chamber 25 of the TRB via conduit 16, and will be transferred upwardly to the distillation chamber 15. As the sodium is evaporated in distillation chamber 15, the more heavy tin liquid will flow back to the tin cathode chamber via conduit 16. The sodium vapor is then condensed in condenser 17 and returned to the sodium anode chamber 12. Because of the significant differences in density between the pure tin liquid and sodium-tin mixtures, the rates of free convection are sufficiently high to operate this system. This phenomena is desirable for the simple operation of such bimetallic systems.

The condenser 17 also serves as an expansion chamber. It will hold excess sodium during full charge conditions and supply it to the anode chamber 12 during discharge. This expansion chamber device is designed to insure contact between the liquid sodium and the electrolyte matrix at all times. In the anode chamber 12, sodium atoms liberate electrons to the external circuit negative terminal 18. The resulting sodium ions migrate through the electrolyte 13 to the cathode. At the cathode, electrons are provided to the migrated sodium ions from the external circuit positive terminal 19. The atomic sodium plus the molecular tin of zero valence state supplied by return pipe 16 then form the bimetal sodium-tin.

The electrons given up at the anode or negative terminal 18 pass by way of the load to the cathode or positive terminal 19 with the current flowing in the opposite direction. Similarly electrodes 21 and 22 are provided for the electrical output of the HTFC component and are preferably hooked in parallel with the TRB electrodes 18, 19 in series with the load, as shown in FIG. 1a. In the thermally regenerative battery preferred in this system, the true electrolyte is the molten salt eutectic which acts, during discharge, as an ion valve for the passage of sodium ions from the anodic fluid to the cathodic fluid. The fluid sodium and the sodium-tin solution may be considered to be transfer materials, and the terms anodic and cathodic fluids best apply to these materials. Heat exchangers 23 and 24, or 23 alone, may be provided to heat the cathodic fluid on its way to regeneration and distillation in chamber 15 via the conduit 14. In addition, heat exchanger 23 can be used to preheat the liquid sodium returning to anode chamber 12 via conduit 26.

In another embodiment, the TRB can be integral with the HTFC.

The following non-limiting examples illustrate the total system efficiency possible with the power modules of this invention. Each example is taken during steady state operation, after start-up has been accomplished by heating both the TRB and HTFC to their respective operating temperatures. The heating can be accomplished simply by burning of some of the fuel cell fuel in a conventional manner.

EXAMPLE 1

The HTFC is a solid oxide type operating at 1000° C. Since such fuel cells can operate practically from 850 to 1100° C., an MN bimetallic couple separable at a higher temperature is needed. Lithium-tin is selected and the TRB electrolyte is correspondingly a mixture of lithium halides. The TRB operates at 350° C. which in this case is also the condenser temperature. The total system efficiency, $\eta_T$, is the efficiency of the fuel cell, $\eta_{FC}$, plus the amount recoverable by the use of the TRB in thermal series with the HTFC, $\eta_R$. This latter efficiency factor, $\eta_R$, is a composite of the voltage efficiency of the TRB, $\eta_{VTRB}$, the waste heat recovery factor, $\eta_{WH}$, and the Carnot efficiency data of the TRB, $\eta_C$. With a fuel cell efficiency, $\eta_{FC}=50\%$, the $\eta_R=(100-\eta_{FC})(\eta_{VTRB}\times\eta_{WH}\times\eta_C)$. Thus, for a fuel cell with a 50% efficiency, and a conservatively estimated $\eta_{VTRB}$ of 0.8 and a $\eta_{WH}$ of 0.5, the total system efficiency is:

$$\eta_T = \eta_{FC} + \eta_R = \eta_{FC} + (100 - \eta_{FC})(\eta_{VTRB} \times \eta_{WH} \times \eta_C)$$

$$\eta_T = 50 + 50 \left(0.8 \times 0.5 \times \frac{1000-350}{1000+273}\right) = 62.7\%$$

EXAMPLE 2

A molten carbonate type fuel cell operating in the range of 600–850° C., and particularly at about 750° C., is combined with a thermal battery system wherein a bimetal cathodic fluid MN such as NaPb, can be separated at this temperature. The TRB electrolyte is a mixture of NaI, NaBr and NaF. The system is similar to that of FIG. 2. The molten carbonate fuel cell operates on hydrogen-rich and/or carbon monoxide-rich fuels. A thermal battery made with Na and Pb operates at about 500° C. The condenser is operated at 350° C. With a typical overall efficiency for the fuel cell of 50%, as above, a thermal battery voltage efficiency of 80 percent, and a 50 percent recovery of fuel cell waste heat, the total system efficiency, $\eta_T$, is:

$$\eta_T = 50 + 50 \times 0.5 \times 0.8 \times \frac{750-350}{750+273} = 57.8\%$$

Again the assumed efficiency recovery factors are conservative estimates.

EXAMPLE 3

In this example a Na-Sn bimetallic couple is used in the TRB. Other parameters of the system as shown schematically in FIG. 2 are:

(1) Power required at regular conditions=20 kw.
(2) Power required at peak demand=50 kw.
(3) Duration of the peak=10 min.
(4) Frequency of peak demands=1 peak/hr.
(5) Operating temperature of HTFC=800° C.
(6) Operating temperature of TRB=550° C.
(7) Open-circuit voltage of the HTFC=1.1 volts.
(8) Voltage-current characteristics for the Na-Sn TRB:

| $E$(volts) | 0.5 | 0.35 | 0.25 |
|---|---|---|---|
| $I/A$(amp./sq. ft.) | 0 | 465 | 715 |

(9) Current density of the fuel cell at $E=0.8$ volt=72 amp./sq. ft.
(10) Polarization curve for the fuel cell: $E=1.1-0.004 \, I/A$.

There are two modes of operation for the system:

(I) Normal operation of 20 kw. of power
(II) Peak performance at 50 kw. of power In Mode I, the fuel cell operates at 0.8 volt and provides the total requirement of 20 kw.

In Mode II, the fuel cell operates at 0.55 volt. At this voltage it will produce maximum power amounting to 25 kw. and heat losses amounting to 25 kw. in addition to the T$\Delta$S heat. The amount of heat available for thermal regeneration per gram equivalent is:

Heat available=heat generated−heat for reforming where heat for reforming refers to the heat supplied to endothermic steam reforming of the hydrocarbon fuel for use in the HTFC, such as reforming JP-4 jet fuel with suitable catalysts. The heat is assumed to come from the fuel cell in this example.

$$Q = [23,060(E_0-E)+T\Delta S] - 5700$$
$$= 23,060 \times 0.55 + 7100 - 5700$$
$$= 14,100 \text{ cal./g. equiv.}$$
$$= 25,400 \text{ B.t.u./lb. equiv.}$$

The amount of heat available for 25 kw. produced is:

$$Q = 25 \text{ kw.} \times \frac{14,100}{0.55 \times 23,060} = 27.7 \text{ kw.}$$

Assuming a thermodynamic cycle operating between 800° C. (fuel cell temperature) and 400° C. (condenser temperature), the Carnot efficiency is:

$$\eta_C = \frac{800-400}{800+273} = 37.3\%$$

Thus, the maximum heat energy that can be converted into work is:

$$W_{max} = 27.7 \text{ kw.} \times 0.373 = 10.3 \text{ kw.}$$

In reality the amount converted into heat is, of course, lower. A conservative assumption is that, out of the 10.3 kw. available as work, 5 kw. will be used. Thus, to supply 50 kw. there will be a battery discharge of $50-25-5=20$ kw.

To determine what size the battery should be, the amount of Na required to supply 20 kw. during 10 min. is calculated and operation at 0.35 volt and 0.5 amp/sq. cm. is taken as typical. The amount of active Na required is approximately 19.0 lbs., and this is the net amount of Na that will be transferred to the Sn cathode after 10 min. of battery discharge.

The total amount of Na is, of course, larger, for example, 40 lbs. The Sn required to form a 50 atom percent solution of Na-Sn is approximately 100 lbs.

The area of the battery providing 25 kw. at 0.35 volt and a current density of 0.5 amp./sq. cm. is:

$$A = \frac{P}{IE} = \frac{25,000}{0.35 \times 0.5} = 143,000 \text{ sq. cm.} = 154 \text{ sq. ft.}$$

During peak operation, the thermal regeneration provides 5 kw. of power. This corresponds to a transport rate of Na of:

$$5 \text{ kw.} \times \frac{860,565 \frac{\text{cal.}}{\text{kw. hr.}} \times 23 \frac{\text{gm.}}{\text{gm. mole}}}{0.35 \text{ v} \times 23,060 \frac{\text{cal.}}{\text{eq. volt}}} = \begin{matrix} 12,200 \text{ g./hr.} \\ = 3.4 \text{ g./sec.} \\ = 0.0075 \text{ lb./sec.} \end{matrix}$$

At 800° C. the vapor pressure of Na over a 50 atom percent Na-Sn solution is 8.5 mm. Hg. At this pressure the rate of the sodium evaporated is 33 c.f./sec. This is a very high volumetric rate requiring rather large conduits. Thus, the condenser is placed as close as possible to the fuel cell in order to minimize the distance the sodium has to travel in the gaseous state.

FIG. 3 shows a T–S diagram for the high temperature fuel cell thermally regenerative battery module of Example 1. This diagram has been drawn on the basis of 1 gram atom each of sodium and tin. It will be observed that the heat engine characteristics of the thermally regenerative battery actually occur between the condenser operating at about 400° C. and the fuel cell operating at about 800° C. rather than the battery proper operating at 550° C. and fuel cell operating at 800° C. The condenser may be fluid cooled and the heat lost to the ambient is not utilized in this system, although it may be utilized in other combinations, for example to preheat liquid JP–4 fuel and water to the vapor state for use in the fuel reforming.

The cycle shown in FIG. 3 can be understood by following a point-to-point description. At point (1) the Na-Sn compound exists after battery discharge, for example, in chamber 25 (FIG. 2). The temperature of this compound is raised to point (2) where it is separated into liquid sodium and liquid tin represented by point ($2^1$) in chamber 15 of FIG. 2.

It should be noted that this is shown on the diagram for illustrative purpose only and in the case of the actual process the state represented by ($2^1$) cannot be readily observed. The liquid tin could be considered to be cooled to (6) and the liquid sodium vaporized to point (3) by extracting waste heat from the fuel cell. Actually, in the cycle shown, the liquid tin entropy is added to the sodium at all points in the cycle. The sodium vapor in heat exchanger 24 and the liquid tin in heat exchanger 23 are cooled to point (4A), and the sodium vapor condensed in 17 to liquid sodium at point (5A). It is of course desirable to reject heat along line in the condenser at the lowest temperature compatible with the physical system. One such temperature is shown as line 4A–5A in FIG. 3 and corresponds to the 400° C. condenser temperature of FIG. 2. An alternative temperature could be 300° C. as seen by line 4A′–5A′ in FIG. 3. Reject heat can be used to heat and vaporize liquid fuels and water for reforming. The liquid sodium is then reheated by heat exchange, e.g., by thermal contact with returning liquid Sn in heat exchanger 23, to point (6) where it is reacted with liquid tin in the TRB and returns to state point (1) completing the cycle. The entropy change for the battery operation is in itself small suggesting that this part of the total system is capable of high efficiency.

Thus, it can be seen that the power module of this invention is able to operate at a valuable average power output level and retain the capacity for high peak loads for short times, but additionally has the operating characteristic of having a continuous peak power output of approximately 50% above the average power output since heat from the fuel cell is utilized in thermally regenerating the battery. In addition, as compared to the fuel cell alone operating at approxmiately a 40% efficiency, calculations for this invention show that ideally approximately 37.3% of the heat output of the fuel cell can be utilized in thermally regenerating the battery thus leading to a significant increase in the efficiency of the system. The system efficiency is based on an assumed duty cycle, and must vary with the given actual cycle, but it is significant that the efficiency will always be higher with heat recovered by the TRB than without.

It should be understood that within the scope of the principles of this invention many equivalents can be employed. For example, where it is desired to use only the electrical recharging of the battery by the fuel cell, one may dispense with the increased efficiency by utilizing the heat from the fuel cell. Thus, the invention is to be limited only by the appended claims.

I claim:
1. A power module comprising in combination:
   (a) a high temperature fuel cell component,
   (b) a thermally regenerative battery component,
   (c) means for thermally coupling said components, and
   (d) means for connecting said components electrically in parallel,
   whereby said fuel cell is thermally moderated by said thermally regenerative battery and said module is load demand responsive.
2. A power module as in claim 1 wherein said means for coupling said components thermally includes:
   (a) means for transferring bimetallic couple terminal fluid of said thermally regenerative battery component to said high temperature fuel cell component.
3. A power module as in claim 2 which includes:
   (a) means for separating said bimetallic couple fluid into an anodic fluid component and a cathodic fluid component,
      said separating means being disposed in heat exchange relationship with said high temperature fuel cell and in communication with said bimetallic couple transferring means,
   and wherein said means for thermal coupling includes:
   (b) means for transferring said anodic and cathodic fluid components from said separating means to said thermally regenerative battery.
4. A power module as in claim 3 wherein said cathodic fluid component transfer means includes:
   (a) means for exchanging heat between said cathodic fluid and said bimetallic couple terminal fluid.
5. A power module as in claim 3 wherein said anodic and cathodic fluid component transfer means includes:
   (a) means for exchanging heat between said anodic and said cathodic fluid.
6. A power module as in claim 3 wherein said anodic fluid component transfer means includes:
   (a) means defining a condenser for said anodic fluid component.
7. A power module as in claim 1 wherein said fuel cell is selected from molten carbonate and solid oxide fuel cells.
8. A power module as in claim 3 wherein said couple is selected from the alkali metal-bismuth, alkali metal-lead and alkali metal-tin systems.
9. A power module as in claim 8 wherein said bimetallic couple is sodium-tin.
10. A method of generating electrical energy comprising:
   (a) supplying separate terminal liquids having different boiling points from a first and a second zone to the anode and cathode respectively of a battery cell component having an electrolyte therebetween whereby a first electrical voltage potential is created thereacross and said terminal liquids combine in said cell,
   (b) supplying fuel to a high temperature fuel cell component whereby electro-chemical reaction takes place to produce a second electrical voltage potential, heat, and fuel waste products, said second voltage being greater than said first voltage,
   (c) transferring said combined liquid from said battery cell to said second zone disposed in heat exchange relationship with said high temperature fuel cell,
   (d) withdrawing heat from said high temperature fuel cell to heat said second zone to a temperature intermediate the boiling points of said terminal liquids, whereby the lower boiling point terminal liquid is separated from said combined liquid in the form of a vapor,
   (e) withdrawing said vapor to said first zone,
   (f) cooling said first zone whereby said vapor is condensed to liquid form,

(g) connecting said battery component and said fuel cell component in a parallel electric circuit such that both of said cells supply current to a load during periods of high demand and said fuel cell recharges said battery cell during periods of low demand.

11. A method as in claim 10 wherein said first zone is maintained at a temperature lower than the temperature of said fuel cell component.

12. A method as in claim 10 wherein said first zone is maintained at a temperature lower than the temperature of said thermally regenerative battery component.

13. A method as in claim 10 wherein said first zone is maintained at a range of from ambient to 500° C.

14. A method as in claim 10 wherein said fuel cell operates in a temperature range of from 600 to 1100° C.

15. A method as in claim 10 wherein said thermally regenerative battery operates between 300 to 600° C.

16. A method of operating a power module comprising:
(a) connecting a thermally regenerative battery and an exothermic high temperature fuel cell in a parallel electric circuit such that both of said cells supply current to a load during periods of high demand and said high temperature fuel cell recharges said thermally regenerative battery during periods of low demand, and
(b) regenerating thermally said thermally regenerative battery by continuous distillation separation of the anodic from the cathodic thermally regenerative battery terminal liquid using waste heat from said high temperature fuel cell, whereby said thermally regenerative battery terminal liquids continuously thermally moderate said high temperature fuel cell,
whereby said module is efficient and load demand responsive.

References Cited

UNITED STATES PATENTS

| | | | |
|---|---|---|---|
| 3,245,836 | 4/1966 | Agruss | 136—86 X |
| 3,357,860 | 12/1967 | Stachurski | 136—83 |
| 3,419,435 | 12/1968 | Recht et al. | 136—83 X |

FOREIGN PATENTS 576,704  5/1958  Italy.

OTHER REFERENCES

Greenberg et al.: "A Possible Regenerative Molten-Salt Thermoelectric Fuel Cell," NASA Publication E–2391, Lewis Research Center, Cleveland, Ohio, June 1967.

ALLEN B. CURTIS, Primary Examiner

U.S. Cl. X.R.

136—83